(12) United States Patent
Xu

(10) Patent No.: US 12,026,864 B2
(45) Date of Patent: Jul. 2, 2024

(54) METHOD AND APPARATUS FOR DETECTING A STATUS OF A LENS, ELECTRONIC DEVICE AND MEDIUM

(71) Applicant: Beijing Baidu Netcom Science Technology Co., Ltd., Beijing (CN)

(72) Inventor: Lihua Xu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 345 days.

(21) Appl. No.: 17/479,258

(22) Filed: Sep. 20, 2021

(65) Prior Publication Data
US 2022/0005179 A1      Jan. 6, 2022

(30) Foreign Application Priority Data

Mar. 16, 2021   (CN) .......................... 202110281571.7

(51) Int. Cl.
*G06T 7/00*        (2017.01)
*B60R 1/00*        (2022.01)
(Continued)

(52) U.S. Cl.
CPC .......... *G06T 7/0002* (2013.01); *G06V 10/443* (2022.01); *G06T 2207/30248* (2013.01)

(58) Field of Classification Search
CPC ......... G06T 7/0002; G06T 2207/30248; G06T 2207/30252; G06T 7/00; G06V 10/443; G06V 20/56; G06V 10/757; G06V 10/462
See application file for complete search history.

(56) References Cited

U.S. PATENT DOCUMENTS

2002/0093577 A1    7/2002   Kitawaki et al.
2015/0334385 A1*  11/2015   Takemura .............. G06V 10/96
                                                 348/175
(Continued)

FOREIGN PATENT DOCUMENTS

CN         101001318 A    7/2007
CN         101729921 A    6/2010
(Continued)

OTHER PUBLICATIONS

The First Office Action for Chinese Application No. 202110281571.7, dated Oct. 9, 2021, eight (8) pages.
(Continued)

*Primary Examiner* — Amandeep Saini
*Assistant Examiner* — Giang Thi Han Nguyen
(74) *Attorney, Agent, or Firm* — KDW Firm PLLC

(57) ABSTRACT

Provided are a method and apparatus for detecting a status of a lens, an electronic device and a medium. A specific implementation includes: determining current feature points included in a current image according to the current image captured at a current moment by a to-be-detected lens of a target driving device; determining historical feature points included in a historical image according to the historical image captured at a historical moment by the to-be-detected lens; and matching the current feature points with the historical feature points and determining a status detection result of the to-be-detected lens according to a matching result. Therefore, an effect of determining a status of the to-be-detected lens of the target driving device is achieved and the problem of a potential safety hazard of the target driving device due to an abnormal status of the to-be-detected lens can be avoided.

16 Claims, 2 Drawing Sheets

(51) Int. Cl.
*G06K 9/46* (2006.01)
*G06V 10/44* (2022.01)

(56) References Cited

U.S. PATENT DOCUMENTS

| | | | |
|---|---|---|---|
| 2016/0307054 A1 | 10/2016 | Takemura et al. | |
| 2017/0140227 A1 | 5/2017 | Takemura et al. | |
| 2020/0307455 A1* | 10/2020 | Liu | H04N 23/55 |

FOREIGN PATENT DOCUMENTS

| | | | | |
|---|---|---|---|---|
| CN | 101894260 | A | | 11/2010 |
| CN | 103400151 | A | | 11/2013 |
| CN | 103546740 | A | | 1/2014 |
| CN | 104093016 | A | | 10/2014 |
| CN | 104520913 | A | | 4/2015 |
| CN | 105872370 | A | | 8/2016 |
| CN | 106548131 | A | | 3/2017 |
| CN | 108416337 | A | | 8/2018 |
| CN | 110689528 | A | | 1/2020 |
| CN | 110769246 | A | | 2/2020 |
| CN | 111291768 | A | | 6/2020 |
| CN | 111522986 | A | | 8/2020 |
| CN | 112040223 | A | | 12/2020 |
| CN | 112040223 | A * | 12/2020 | H04N 17/002 |
| CN | 112215794 | A | | 1/2021 |
| CN | 112242045 | A * | 1/2021 | |
| EP | 2821960 | A1 * | 1/2015 | G06T 7/0002 |

OTHER PUBLICATIONS

The First Search Report for Chinese Application No. 202110281571. 7, two (2) pages.
The Fourth Office Action dated Feb. 9, 2023, for Chinese Application No. 202110281571.7 ( pages).
The Search Report dated Feb. 6, 2023, for Chinese Application No. 202110281571.7, five (5) pages.
The Supplemental Search Report dated Apr. 26, 2023, for Chinese Application No. 202110281571.7, four (4) pages.
Peng et al., "Robust Real-time Electronic Image Stabilization Based on Feature Matching and Checking", ACTA Photonic Sinica vol. 40, No. 9, pp. 1443-1446, Sep. 2011.
Zhou et al., "ORB feature matching optimization based on sparse optical flow method", Journal of Applied Optics, vol. 40, No. 4, pp. 583-588, Jul. 2019.
The Third Office Action dated Sep. 5, 2022, for Chinese Application No. 202110281571.7 (16 pages).
The Supplemental Search Report dated Aug. 31, 2022, for Chinese Application No. 202110281571.7, six (6) pages.

* cited by examiner

METHOD AND APPARATUS FOR DETECTING A STATUS OF A LENS, ELECTRONIC DEVICE AND MEDIUM

CROSS-REFERENCE TO RELATED APPLICATION(S)

This application claims priority to Chinese Patent Application No. 202110281571.7 filed Mar. 16, 2021, the disclosure of which is incorporated herein by reference in its entirety.

TECHNICAL FIELD

The present disclosure relates to the field of image processing and, in particular, to the technical field of autonomous driving, cloud computing and cloud services, especially a method and apparatus for detecting a status of a lens, an electronic device and a medium.

BACKGROUND

In the field of autonomous driving or assisted driving, a camera of a vehicle is a key sensor. If a camera lens of an autonomous driving vehicle is dirty in a driving process, the vehicle will be provided with wrong road information. A failure to effectively detect or identify that the camera lens is dirty might cause a serious safety accident.

However, at present, there are no effective schemes for detecting whether the camera lens of the vehicle is dirty.

SUMMARY

The present disclosure provides a method and apparatus for detecting a status of a lens of a driving device, an electronic device and a medium.

According to an aspect of the present disclosure, a method for detecting a status of a lens is provided. The method includes steps described below.

Current feature points included in a current image are determined according to the current image captured at a current moment by a to-be-detected lens of a target driving device.

Historical feature points included in a historical image are determined according to the historical image captured at a historical moment by the to-be-detected lens.

The current feature points are matched with the historical feature points and a status detection result of the to-be-detected lens is determined according to a matching result.

According to another aspect of the present disclosure, an apparatus for detecting a status of a lens is provided. The apparatus includes a current feature point determination module, a historical feature point determination module and a detection result determination module.

The current feature point determination module is configured to determine current feature points included in a current image according to the current image captured at a current moment by a to-be-detected lens of a target driving device.

The historical feature point determination module is configured to determine historical feature points included in a historical image according to the historical image captured at a historical moment by the to-be-detected lens.

The detection result determination module is configured to match the current feature points with the historical feature points and determine a status detection result of the to-be-detected lens according to a matching result.

According to another aspect of the present disclosure, an electronic device is provided. The device includes at least one processor and a memory communicatively connected to the at least one processor.

The memory stores instructions executable by the at least one processor to enable the at least one processor to perform any method in the present disclosure.

According to another aspect of the present disclosure, a non-transitory computer-readable storage medium is provided. The storage medium stores computer instructions for causing a computer to perform any method in the present disclosure.

According to another aspect of the present disclosure, a computer program product is provided. The computer program product includes a computer program which, when executed by a processor, causes the processor to perform any method in the present disclosure.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present disclosure. In the drawings.

DETAILED DESCRIPTION

Example embodiments of the present disclosure, including details of embodiments of the present disclosure, are described hereinafter in conjunction with the drawings to facilitate understanding. The example embodiments are illustrative only. Therefore, it is to be understood by those of ordinary skill in the art that various changes and modifications may be made to the embodiments described herein without departing from the scope and spirit of the present disclosure. Similarly, description of well-known functions and constructions is omitted hereinafter for clarity and conciseness.

Figure 1:
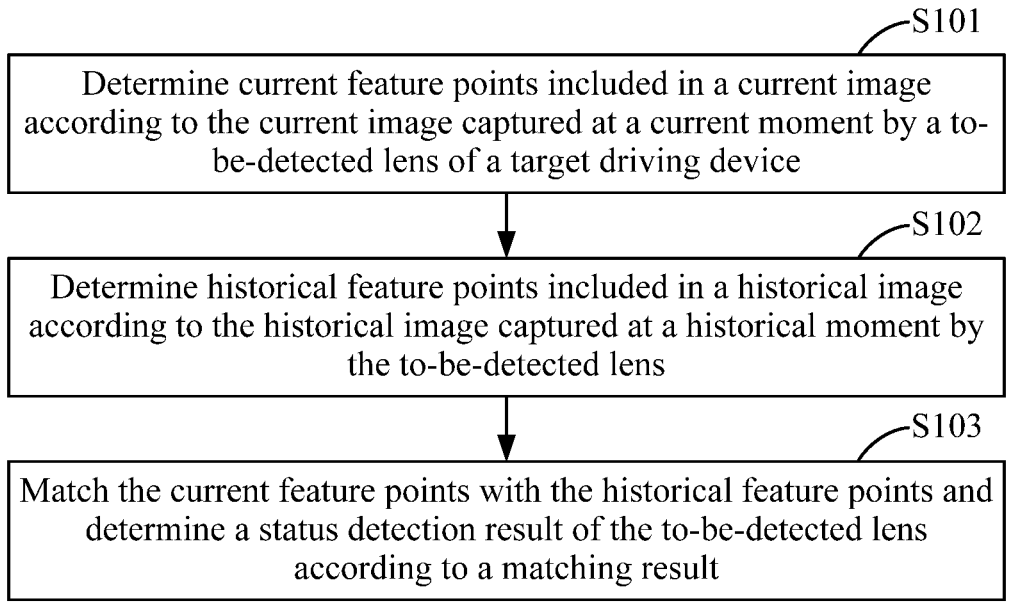
FIG. 1 is a flowchart of a method for detecting a status of a lens according to an embodiment of the present disclosure.

FIG. 1 is a flowchart of a method for detecting a status of a lens according to an embodiment of the present disclosure. This embodiment is applicable to the case of detecting a status of a lens of a driving device. The method in this embodiment may be performed by an apparatus for detecting a status of a lens. The apparatus may be implemented by software and/or hardware and integrated into any electronic device having a computing capability.

As shown in FIG. 1, the method for detecting a status of a lens according to this embodiment may include steps described below.

In S101, current feature points included in a current image are determined according to the current image captured at a current moment by a to-be-detected lens of a target driving device.

The target driving device includes, but is not limited to, a traffic device in a driving state, such as an automobile, an electric vehicle, or a moped. The target driving device is equipped with a lens for capturing an image of a surrounding environment so that the target driving device makes an autonomous driving decision or an assisted driving decision based on the image captured by the lens, such as automatic braking or automatic parking. The status of the lens directly affects the quality of the captured image and thus indirectly affects the driving safety of the target driving device. Therefore, it is necessary to detect the status of the lens equipped on the target driving device, that is, the to-be-detected lens in this embodiment.

In an embodiment, when the target driving device is in the driving state, that is, when the driving speed of the target driving device is greater than 0, an image capture function of the to-be-detected lens is enabled and the to-be-detected lens captures images according to a preset period. When the to-be-detected lens captures the current image at the current moment, feature extraction is performed on the current image at preset intervals. A method for feature extraction includes, but is not limited to, an Oriented FAST and Rotated BRIEF (ORB) algorithm, a local binary patterns (LBP) algorithm, a scale-invariant feature transform (SIFT) algorithm or the like. In this manner, the current feature points of a preset dimension and included in the current image are obtained, where the current feature points include, but are not limited to, pixel points with sharp changes in gray value or sharp changes in curvature, which can reflect the essential characteristics of the current image. The preset dimension of the current feature points may be preset according to requirements, for example, 128-dimensional.

The current feature points included in the current image are determined according to the current image captured at the current moment by the to-be-detected lens of the target driving device so that the current feature points in the current image are acquired, which lays a data basis for subsequent feature point matching with historical feature points.

In S102, historical feature points included in a historical image are determined according to the historical image captured at a historical moment by the to-be-detected lens.

The historical moment is a moment previous to the current moment. Correspondingly, the historical image is an image captured at the historical moment by the to-be-detected lens. The number of historical images may be preset according to the requirements. It is conceivable that the larger the number of historical images, the higher accuracy the final status detection result of the to-be-detected lens.

In an embodiment, the historical image captured at the historical moment by the to-be-detected lens is stored in a local or cloud server of the target driving device. A preset number of historical images are acquired from the local or cloud server of the target driving device, and the feature extraction is performed on each historical image at preset intervals so that the historical feature points of a preset dimension and included in each historical image are obtained. To ensure the accuracy of the final status detection result of the to-be-detected lens, parameters such as the preset intervals, the method for feature extraction, and the dimension of feature points involved during the feature extraction on each historical image are all consistent with those involved during the feature extraction on the current image.

The historical feature points included in the historical image are determined according to the historical image captured at the historical moment by the to-be-detected lens so that the historical feature points in the historical image are acquired, which lays a data basis for subsequent feature point matching with the current feature points.

In S103, the current feature points are matched with the historical feature points and the status detection result of the to-be-detected lens is determined according to a matching result.

The status detection result includes two results: an abnormal status and a normal status. The abnormal status indicates that a foreign matter blocks a surface of the to-be-detected lens or a flaw or crack exists on the surface of the to-be-detected lens. In this case, the image captured by the to-be-detected lens is distorted. The normal status indicates that no foreign matter blocks the surface of the to-be-detected lens or no flaw or crack exists on the surface of the to-be-detected lens. Accordingly, the image captured by the to-be-detected lens is not distorted.

In an embodiment, the current feature points are matched with the historical feature points by using a preset feature point matching with algorithm and it is determined for any one current feature point of the current feature points whether a historical feature point matching with the current feature point exists. If the historical feature point matching with the current feature point exists, it indicates that similar image content exists in the historical image and the current image captured by the to-be-detected lens of the target driving device. However, since the target driving device is in the driving state, images captured at different moments have different image content in theory. Therefore, it may be determined that the similar image content is caused by the foreign matter blocking the surface of the to-be-detected lens, that is, the status detection result of the to-be-detected lens is the abnormal status. Correspondingly, if the historical feature point matching with the current feature point does not exist, it indicates that no similar image content exists in the historical image and the current image captured by the to-be-detected lens of the target driving device. Therefore, it may be determined that no foreign matter blocks the surface of the to-be-detected lens, that is, the status detection result of the to-be-detected lens is the normal status.

In an embodiment, if it is determined that the status detection result of the to-be-detected lens is the abnormal status, corresponding emergency measures may be taken, such as issuing a warning to an occupant in the target driving device and braking slowly. In another example, a cleaning device disposed around the to-be-detected lens is controlled to operate and clean the surface of the to-be-detected lens, so as to clean off the foreign matter blocking the to-be-detected lens.

In an embodiment, the step in which "the current feature points are matched with the historical feature points" includes steps described below.

Current feature descriptors of the current feature points and historical feature descriptors of the historical feature points are determined. The current feature descriptors are matched with the historical feature descriptors.

A feature descriptor is a vector representation for describing information of the corresponding feature point such as a feature point direction and a feature point scale.

In an embodiment, the current feature descriptors corresponding to the current feature points are calculated, the historical feature descriptors corresponding to the historical feature points are calculated, similarity calculations are performed on the current feature descriptors and the historical feature descriptors, and a current feature point and a historical feature point which correspond to similar feature descriptors are used as a pair of feature points matching each other. A similarity calculation method includes, but is not limited to, a Hamming distance method, a cross-matching method, a violent matching method or the like.

The current feature descriptors of the current feature points and the historical feature descriptors of the historical feature points are determined, and the current feature descriptors are matched with the historical feature descriptors, so that feature point matching is performed based on of feature point descriptors, which lays a basis for determining the status detection result of the to-be-detected lens.

The current feature points are matched with the historical feature points and the status detection result of the to-be-detected lens is determined according to the matching result, so that the status detection result of the to-be-detected lens is automatically determined, thereby saving labor and ensuring the driving safety of the target driving device.

In the present disclosure, the current feature points included in the current image are determined according to the current image captured at the current moment by the to-be-detected lens of the target driving device, the historical feature points included in the historical image are determined according to the historical image captured at the historical moment by the to-be-detected lens, and then the current feature points are matched with the historical feature points and the status detection result of the to-be-detected lens is determined according to the matching result, so that the status of the to-be-detected lens of the target driving device is determined, the problem of a potential safety hazard of the target driving device due to the abnormal status of the to-be-detected lens can be avoided, and a labor cost can be saved without the participation of humans.

Figure 2:
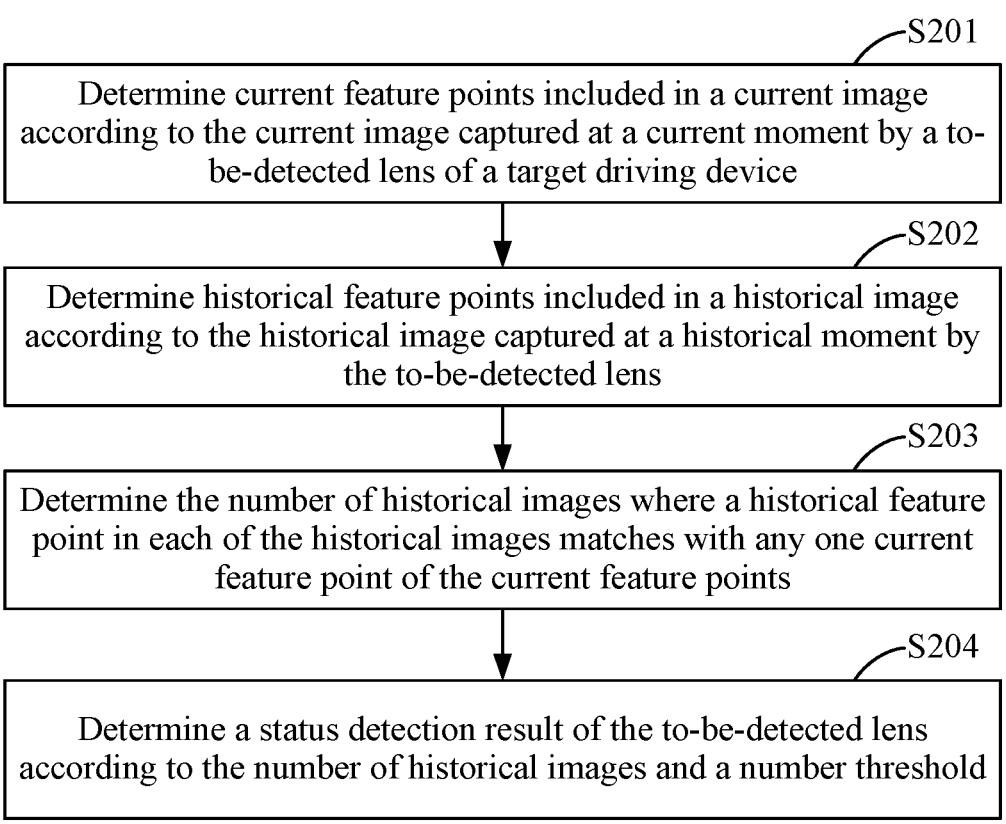
FIG. 2 is a flowchart of a method for detecting a status of a lens according to an embodiment of the present disclosure.

FIG. 2 is a flowchart of a method for detecting a status of a lens according to an embodiment of the present application. This embodiment is further optimized and extended based on the preceding solution and may be combined with the preceding various embodiments.

In S201, current feature points included in a current image are determined according to the current image captured at a current moment by a to-be-detected lens of a target driving device.

In S202, historical feature points included in a historical image are determined according to the historical image captured at a historical moment by the to-be-detected lens.

In S203, the number of historical images where a historical feature point in each of the historical images matches with any one current feature point of the current feature points is determined.

In an embodiment, the current feature points are matched with the historical feature points in each historical image. For any one current feature point, if the historical feature points matching with the current feature point exist, the number of historical images where a historical feature point in each of the historical images matches with the current feature point is determined.

For example, if a current feature point A matches a historical feature point B, a historical feature point C, a historical feature point D and a historical feature point E, and the historical feature point B belongs to a historical image B1, the historical feature point C belongs to a historical image C1, the historical feature point D belongs to a historical image D1, and the historical feature point E belongs to a historical image E1, it is determined that the number of historical images to which the historical feature points matching with the current feature point A belong is 4.

In S204, a status detection result of the to-be-detected lens is determined according to the number of historical images and a number threshold.

In an embodiment, the number of historical images determined in S203 is compared with a preset number threshold and the status detection result of the to-be-detected lens is determined based on a comparison result.

In an embodiment, in response to the number of historical images being greater than the number threshold, it is determined that a status of the to-be-detected lens is abnormal.

In an embodiment, the number of historical images is compared with the number threshold. If the number of historical images is greater than the number threshold, it indicates that similar image content exists in historical images captured at many different historical moments and the current image, and it may be further determined that the status detection result of the to-be-detected shot is an abnormal status. Correspondingly, if the number of historical images is less than or equal to the number threshold, the target driving device might drive at a relatively slow speed so that the similar image content exists in the historical images and the current image. Therefore, it cannot be determined that the status detection result of the to-be-detected shot is the abnormal status.

If the number of historical images is greater than the number threshold, it is determined that the status of the to-be-detected lens is abnormal, which improves the accuracy and reliability of the status detection result of the to-be-detected lens.

In an embodiment, the number threshold is determined according to a driving speed of the target driving device.

If the target driving device drives at a relatively slow speed, the similar image content easily exists in the historical images and the current image so that the status detection result of the to-be-detected lens is wrongly determined. Therefore, the number threshold needs to be increased, so as to avoid the problem of wrong determination. Correspondingly, if the target driving device drives at a relatively high speed, the similar image content does not easily exist in the historical images and the current image so that the status detection result of the to-be-detected lens is wrongly determined at a relatively low probability. Therefore, the number threshold needs to be decreased, so as to improve detection efficiency. In other words, in this embodiment, the number threshold is inversely proportional to the driving speed of the target driving device.

The number threshold is determined according to the driving speed of the target driving device so that the status detection result of the to-be-detected lens is prevented from being wrongly determined and the accuracy and reliability of the detection result are improved.

In the present disclosure, the number of the historical images where a historical feature point in each of the historical images matches with the any one current feature point is determined, and the status detection result of the to-be-detected lens is determined according to the number of historical images and the number threshold so that the status detection result of the to-be-detected lens is prevented from being wrongly determined and the accuracy and reliability of the detection result are improved.

Based on the preceding embodiments, after it is determined that the status of the to-be-detected lens is abnormal, the method further includes steps described below.

Historical image coordinates of the historical feature points matching with the any one current feature point are determined and the status detection result of the to-be-detected lens is checked according to the historical image coordinates and a current image coordinate of the current feature point.

The historical image coordinate represents a relative position coordinate of the historical feature point in the corresponding historical image, and correspondingly, the current image coordinate represents a relative position coordinate of the current feature point in the current image.

In an embodiment, if the status detection result of the to-be-detected lens is the abnormal status, the current image coordinate of the any one current feature point in the current image and the historical image coordinates of the historical feature points matching with the current feature point in the corresponding historical images are acquired. Distance values between different image coordinates are determined according to the current image coordinate and the historical image coordinates, and the status detection result of the to-be-detected lens is checked according to the magnitude of the distance values between different image coordinates. For example, if the distance values between different image coordinates are relatively large, since the position of a blocking object relative to the to-be-detected lens is fixed, it is considered that the case where the current feature point matches the historical feature points is not caused by the blocking object on a surface of the to-be-detected lens and then it is checked that the status detection result of the to-be-detected lens is a normal status.

The historical image coordinates of the historical feature points matching with the any one current feature point are determined, and the status detection result of the to-be-detected lens is checked according to the historical image coordinates and the current image coordinate of the current feature point, so that the status detection result is checked, thereby ensuring the accuracy and reliability of the status detection result.

Based on the preceding embodiments, the step in which the status detection result of the to-be-detected lens is checked according to the historical image coordinates and the current image coordinate of the current feature point includes steps described below.

The distance values between different image coordinates in a coordinate set composed of the historical image coordinates and the current image coordinate are determined, and the status detection result of the to-be-detected lens is checked according to the distance values and a distance value threshold.

In an embodiment, the current image coordinate and the historical image coordinates are used as the coordinate set, the distance values between different image coordinates in the coordinate set are calculated, the distance values each are compared with the distance value threshold, a relationship in magnitude between each distance value and the distance value threshold is determined, a proportion of distance values less than the distance value threshold among all the distance values is counted, and if the proportion is greater than a proportion threshold such as 95%, the status of the to-be-detected lens is determined to be abnormal.

The distance values between different image coordinates in the coordinate set composed of the historical image coordinates and the current image coordinate are determined, and the status detection result of the to-be-detected lens is checked according to the distance values and the distance value threshold, so that the status detection result is checked, thereby ensuring the accuracy and reliability of the status detection result.

Based on the preceding embodiments, the step in which the status detection result of the to-be-detected lens is checked according to the distance values and the distance value threshold includes the step described below.

In response to a maximum distance value of the distance values being less than the distance value threshold, it is determined that the status of the to-be-detected lens is abnormal.

If the maximum distance value of the distance values is less than the distance value threshold, it indicates that positions of the historical feature points relative to each other and positions of the historical feature points relative to the matched current feature point are fixed. Therefore, it is determined that the case where the current feature point matches the historical feature points is caused by the blocking object on the surface of the to-be-detected lens, that is, the status of the to-be-detected lens is determined to be abnormal. The distance value threshold is at a pixel level, for example, is set to 100 pixels.

If the maximum distance value of the distance values is less than the distance value threshold, it is determined that the status of the to-be-detected lens is abnormal, so that the status detection result is checked, thereby ensuring the accuracy and reliability of the status detection result.

Figure 3:
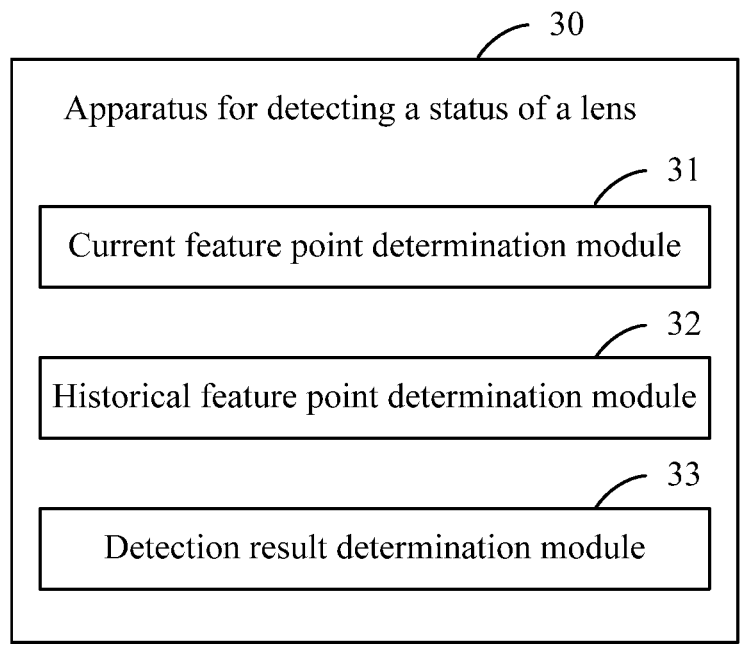
FIG. 3 is a structure diagram of an apparatus for detecting a status of a lens according to an embodiment of the present disclosure.

FIG. 3 is a structure diagram of an apparatus for detecting a status of a lens according to an embodiment of the present disclosure. This embodiment is applicable to the case of detecting a status of a lens of a driving device. The apparatus in this embodiment may be implemented by software and/or hardware and integrated into any electronic device having a computing capability.

As shown in FIG. 3, the apparatus 30 for detecting a status of a lens in this embodiment may include a current feature point determination module 31, a historical feature point determination module 32 and a detection result determination module 33.

The current feature point determination module 31 is configured to determine current feature points included in a current image according to the current image captured at a current moment by a to-be-detected lens of a target driving device.

The historical feature point determination module 32 is configured to determine historical feature points included in a historical image according to the historical image captured at a historical moment by the to-be-detected lens.

The detection result determination module 33 is configured to match the current feature points with the historical feature points and determine a status detection result of the to-be-detected lens according to a matching result.

In an embodiment, the detection result determination module 33 is configured to determine the number of historical images where a historical feature point in each of the historical images matches with any one current feature point of the current feature points.

The detection result determination module 33 is configured to determine the status detection result of the to-be-detected lens according to the number of historical images and a number threshold.

In an embodiment, the detection result determination module 33 is further configured to determine that the status of the to-be-detected lens is abnormal in response to the number of historical images being greater than the number threshold.

In an embodiment, the number threshold is determined according to the driving speed of the target driving device.

In an embodiment, the apparatus further includes a check module configured to determine historical image coordinates of the historical feature points matching with the current feature point and check the status detection result of the to-be-detected lens according to the historical image coordinates and a current image coordinate of the current feature point.

In an embodiment, the check module is further configured to determine distance values between different image coordinates in a coordinate set composed of the historical image coordinates and the current image coordinate and check the status detection result of the to-be-detected lens according to the distance values and a distance value threshold.

In an embodiment, the check module is further configured to determine that the status of the to-be-detected lens is abnormal in response to a maximum distance value of the distance values being less than the distance value threshold.

In an embodiment, the detection result determination module is further configured to determine current feature descriptors of the current feature points and historical feature descriptors of the historical feature points.

The detection result module is further configured to match the current feature descriptors with the historical feature descriptors.

The apparatus 30 for detecting a status of a lens in the embodiment of the present disclosure may perform the method for detecting a status of a lens in the embodiments of the present disclosure and has function modules and beneficial effects corresponding to the performed method. For content not described in detail in this embodiment, see description in any method embodiment of the present disclosure.

According to embodiments of the present disclosure, the present disclosure further provides an electronic device, a readable storage medium and a computer program product.

Figure 4:
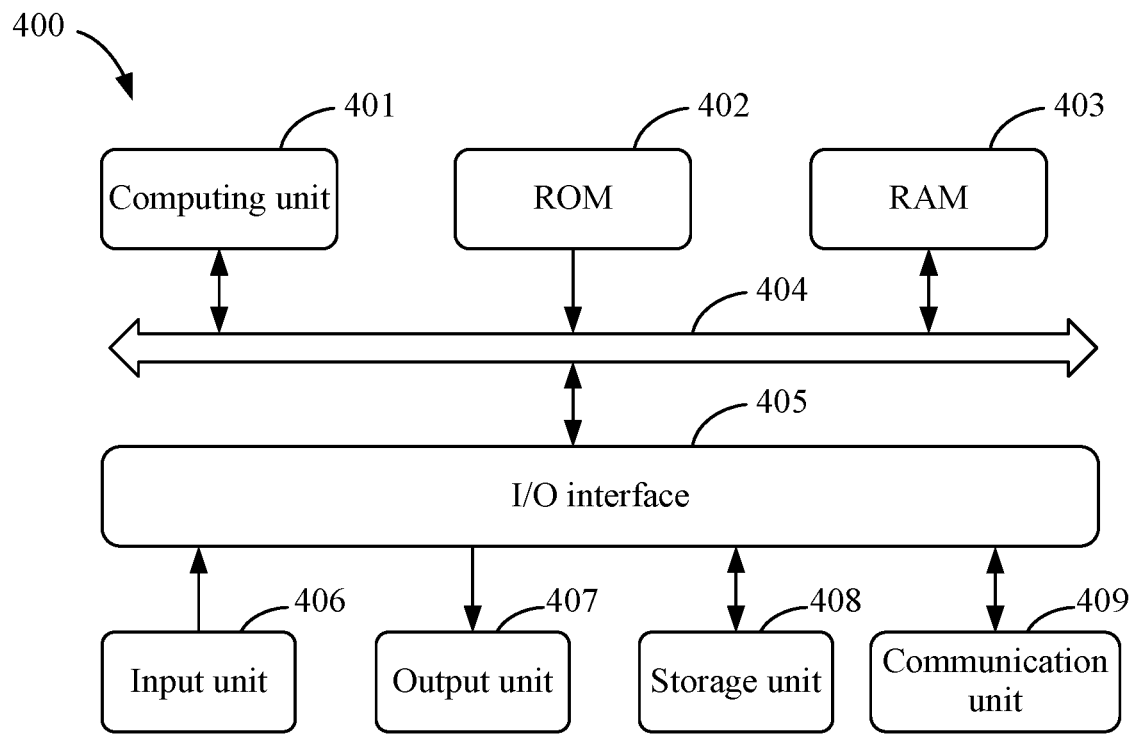
FIG. 4 is a block diagram of an electronic device for implementing a method for detecting a status of a lens according to an embodiment of the present disclosure.

FIG. 4 is a block diagram of an example electronic device 400 for implementing an embodiment of the present disclosure. Electronic devices are intended to represent various forms of digital computers, for example, laptop computers, desktop computers, worktables, personal digital assistants, servers, blade servers, mainframe computers and other applicable computers. Electronic devices may also represent various forms of mobile devices, for example, personal digital assistants, cellphones, smartphones, wearable devices and other similar computing devices. Herein the shown components, the connections and relationships between these components, and the functions of these components are illustrative only and are not intended to limit the implementation of the present disclosure as described and/or claimed herein.

As shown in FIG. 4, the device 400 includes a computing unit 401. The computing unit 401 may perform various appropriate actions and processing according to a computer program stored in a read-only memory (ROM) 402 or a computer program loaded into a random-access memory (RAM) 403 from a storage unit 408. The RAM 403 may also store various programs and data required for operations of the device 400. The computing unit 401, the ROM 402 and the RAM 403 are connected to each other by a bus 404. An input/output (I/O) interface 405 is also connected to the bus 404.

Multiple components in the device 400 are connected to the I/O interface 405. The multiple components include an input unit 406 such as a keyboard or a mouse, an output unit 407 such as various types of displays or speakers, the storage unit 408 such as a magnetic disk or an optical disk, and a communication unit 409 such as a network card, a modem or a wireless communication transceiver. The communication unit 409 allows the device 400 to exchange information/data with other devices over a computer network such as the Internet and/or over various telecommunication networks.

The computing unit 401 may be a general-purpose and/or special-purpose processing component having processing and computing capabilities. Examples of the computing unit 401 include, but are not limited to, a central processing unit (CPU), a graphics processing unit (GPU), a special-purpose artificial intelligence (AI) computing chip, a computing unit executing machine learning model algorithms, a digital signal processor (DSP), and any appropriate processor, controller and microcontroller. The computing unit 401 performs various methods and processing described above, such as the method for detecting a status of a lens. For example, in some embodiments, the method for detecting a status of a lens may be implemented as a computer software program tangibly contained in a machine-readable medium such as the storage unit 408. In some embodiments, part or all of computer programs may be loaded and/or installed on the device 400 via the ROM 402 and/or the communication unit 409. When the computer programs are loaded into the RAM 403 and executed by the computing unit 401, one or more steps of the preceding method for detecting a status of a lens may be performed. Alternatively, in other embodiments, the computing unit 401 may be configured, in any other appropriate manner (for example, by means of firmware), to perform the method for detecting a status of a lens.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), and computer hardware, firmware, software and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input device and at least one output device and transmitting data and instructions to the memory system, the at least one input device and the at least one output device.

Program codes for implementation of the method of the present disclosure may be written in any combination of one or more programming languages. These program codes may be provided for the processor or controller of a general-purpose computer, a special-purpose computer or another programmable data processing device to enable functions/operations specified in a flowchart and/or a block diagram to be implemented when the program codes are executed by the processor or controller. The program codes may all be executed on a machine; may be partially executed on a machine; may serve as a separate software package that is partially executed on a machine and partially executed on a remote machine; or may all be executed on a remote machine or a server.

In the context of the present disclosure, the machine-readable medium may be a tangible medium that contains or stores a program available for an instruction execution system, apparatus or device or a program used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any appropriate combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on a computer. The computer has a display device (for example, a cathode-ray tube (CRT) or liquid-crystal display (LCD) monitor) for displaying information to the user; and a keyboard and a pointing device (for example, a mouse or a trackball) through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. The components of the system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on the respective computers and having a client-server relationship to each other. The server may be a cloud server, also referred to as a cloud computing server or a cloud host. As a host product in a cloud computing service system, the server solves the defects of difficult management and weak service scalability in a related physical host and a related virtual private server (VPS) service.

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, sub-combinations and substitutions may be made depending on design requirements and other factors. Any modifications, equivalent substitutions, improvements and the like made within the spirit and principle of the present disclosure are within the scope of the present disclosure.

What is claimed is:

1. A method for detecting a status of a lens, comprising:
   determining current feature points comprised in a current image according to the current image captured at a current moment by a to-be-detected lens of a target driving device;
   determining historical feature points comprised in a historical image according to the historical image captured at a historical moment by the to-be-detected lens; and
   matching the current feature points with the historical feature points and determining a status detection result of the to-be-detected lens according to a matching result;
   wherein the matching the current feature points with the historical feature points comprises:
   determining current feature descriptors of the current feature points and historical feature descriptors of the historical feature points, wherein a feature descriptor is a vector representation for describing direction information and scale information of a feature point;
   performing similarity calculations on the current feature descriptors and the historical feature descriptors; and
   using a current feature point and a historical feature point which correspond to similar feature descriptors as a pair of feature points matching each other;
   after determining that the status detection result of the to-be-detected lens is abnormal, the method further comprises:
   determining historical image coordinates of historical feature points matching with the any one current feature point and checking the status detection result of the to-be-detected lens according to the historical image coordinates and a current image coordinate of the any one current feature point; and
   after determining that the status detection result of the to-be-detected lens is abnormal, the method further comprises:
   issuing a warning to an occupant in the target driving device and braking slowly; or
   controlling a cleaning device disposed around the to-be-detected lens to operate and clean a surface of the to-be-detected lens.

2. The method of claim 1, wherein determining the status detection result of the to-be-detected lens according to the matching result comprises:
   determining a number of historical images where a historical feature point in each of the historical images matches with any one current feature point; and
   determining the status detection result of the to-be-detected lens according to the number of historical images and a number threshold.

3. The method of claim 2, wherein determining the status detection result of the to-be-detected lens according to the number of historical images and the number threshold comprises:
   in response to the number of historical images being greater than the number threshold, determining that a status of the to-be-detected lens is abnormal.

4. The method of claim 3, wherein the number threshold is determined according to a driving speed of the target driving device.

5. The method of claim 2, wherein the number threshold is determined according to a driving speed of the target driving device.

6. The method of claim 1, wherein checking the status detection result of the to-be-detected lens according to the historical image coordinates and the current image coordinate of the any one current feature point comprises:
  determining distance values between different image coordinates in a coordinate set composed of the historical image coordinates and the current image coordinate and checking the status detection result of the to-be-detected lens according to the distance values and a distance value threshold.

7. The method of claim 6, wherein checking the status detection result of the to-be-detected lens according to the distance values and the distance value threshold comprises:
  in response to a maximum distance value of the distance values being less than the distance value threshold, determining that the status of the to-be-detected lens is abnormal.

8. An electronic device, comprising:
  at least one processor; and
  a memory communicatively connected to the at least one processor;
  wherein the memory stores instructions executable by the at least one processor, and the processor is configured to:
  determine current feature points comprised in a current image according to the current image captured at a current moment by a to-be-detected lens of a target driving device;
  determine historical feature points comprised in a historical image according to the historical image captured at a historical moment by the to-be-detected lens; and
  match the current feature points with the historical feature points and determine a status detection result of the to-be-detected lens according to a matching result;
  wherein the processor is configured to match the current feature points with the historical feature points in the following manner:
  determining current feature descriptors of the current feature points and historical feature descriptors of the historical feature points, wherein a feature descriptor is a vector representation for describing direction information and scale information of a feature point;
  performing similarity calculations on the current feature descriptors and the historical feature descriptors; and
  using a current feature point and a historical feature point which correspond to similar feature descriptors as a pair of feature points matching each other;
  wherein the processor is further configured to: after determining that the status detection result of the to-be-detected lens is abnormal, determine historical image coordinates of historical feature points matching with the any one current feature point and check the status detection result of the to-be-detected lens according to the historical image coordinates and a current image coordinate of the any one current feature point; and
  wherein the processor is further configured to: after determining that the status detection result of the to-be-detected lens is abnormal, issue a warning to an occupant in the target driving device and brake slowly; or control a cleaning device disposed around the to-be-detected lens to operate and clean a surface of the to-be-detected lens.

9. The electronic device according to claim 8, wherein the processor is configured to determine the status detection result of the to-be-detected lens according to the matching result in the following manner:
  determining a number of historical images where a historical feature point in each of the historical images matches with any one current feature point; and
  determining the status detection result of the to-be-detected lens according to the number of historical images and a number threshold.

10. The electronic device according to claim 9, wherein the processor is configured to determine the status detection result of the to-be-detected lens according to the number of historical images and the number threshold in the following manner:
  in response to the number of historical images being greater than the number threshold, determining that a status of the to-be-detected lens is abnormal.

11. The electronic device according to claim 9, wherein the number threshold is determined according to a driving speed of the target driving device.

12. The electronic device according to claim 8, wherein the processor is configured to check the status detection result of the to-be-detected lens according to the historical image coordinates and the current image coordinate of the any one current feature point in the following manner:
  determining distance values between different image coordinates in a coordinate set composed of the historical image coordinates and the current image coordinate and checking the status detection result of the to-be-detected lens according to the distance values and a distance value threshold.

13. A non-transitory computer-readable storage medium storing computer instructions for causing a computer to perform:
  determining current feature points comprised in a current image according to the current image captured at a current moment by a to-be-detected lens of a target driving device;
  determining historical feature points comprised in a historical image according to the historical image captured at a historical moment by the to-be-detected lens; and
  matching the current feature points with the historical feature points and determining a status detection result of the to-be-detected lens according to a matching result;
  wherein the computer instructions cause the computer to perform matching the current feature points with the historical feature points in the following manner:
  determining current feature descriptors of the current feature points and historical feature descriptors of the historical feature points, wherein a feature descriptor is a vector representation for describing direction information and scale information of a feature point;
  performing similarity calculations on the current feature descriptors and the historical feature descriptors; and
  using a current feature point and a historical feature point which correspond to similar feature descriptors as a pair of feature points matching each other;
  wherein the computer instructions cause the computer to perform: after determining that the status detection result of the to-be-detected lens is abnormal, determining historical image coordinates of historical feature points matching with the any one current feature point and checking the status detection result of the to-be-detected lens according to the historical image coordinates and a current image coordinate of the any one current feature point; and
  wherein the computer instructions cause the computer to perform: after determining that the status detection result of the to-be-detected lens is abnormal, issuing a warning to an occupant in the target driving device and braking slowly; or controlling a cleaning device disposed around the to-be-detected lens to operate and clean a surface of the to-be-detected lens.

14. The non-transitory computer-readable storage medium according to claim 13, wherein determining the status detection result of the to-be-detected lens according to the matching result comprises:
- determining a number of historical images where a historical feature point in each of the historical images matches with any one current feature point; and
- determining the status detection result of the to-be-detected lens according to the number of historical images and a number threshold.

15. The non-transitory computer-readable storage medium according to claim 14, wherein determining the status detection result of the to-be-detected lens according to the number of historical images and the number threshold comprises:
- in response to the number of historical images being greater than the number threshold, determining that a status of the to-be-detected lens is abnormal.

16. The non-transitory computer-readable storage medium according to claim 14, wherein the number threshold is determined according to a driving speed of the target driving device.

* * * * *